United States Patent
Harned et al.

(10) Patent No.: US 8,104,695 B2
(45) Date of Patent: Jan. 31, 2012

(54) FUEL INJECTOR GASSIFER NOZZLE HAVING ADJUSTABLE ANNULUS

(75) Inventors: Monty Lee Harned, Sugar Land, TX (US); Doug Scott Byrd, Greer, SC (US); Paul Stephen Dimascio, Greer, SC (US); Shashishekara Sitharamarao Talya, Houston, TX (US)

(73) Assignee: General Electric Company, Schenectady, NY (US)

( * ) Notice: Subject to any disclaimer, the term of this patent is extended or adjusted under 35 U.S.C. 154(b) by 450 days.

(21) Appl. No.: 12/406,428

(22) Filed: Mar. 18, 2009

(65) Prior Publication Data

US 2010/0237173 A1  Sep. 23, 2010

(51) Int. Cl.
*B05B 7/12* (2006.01)

(52) U.S. Cl. .................. 239/416; 239/416.1; 239/416.4; 239/417; 239/422; 239/424; 239/428

(58) Field of Classification Search .................. 239/408, 239/412, 413, 416, 416.1, 416.4–417.5, 420, 239/422, 423, 424, 428
See application file for complete search history.

(56) References Cited

U.S. PATENT DOCUMENTS

| | | | | |
|---|---|---|---|---|
| 705,565 A | * | 7/1902 | Dye | 239/137 |
| 1,414,438 A | * | 5/1922 | Smith et al. | 239/132.3 |
| 2,303,925 A | | 12/1942 | Fisher | |
| 2,519,200 A | | 8/1950 | Schumann | |
| 2,732,257 A | * | 1/1956 | Cress | 239/428 |
| 3,070,317 A | * | 12/1962 | Hunter et al. | 239/402 |
| 3,615,053 A | * | 10/1971 | Pease et al. | 239/407 |
| 3,685,740 A | * | 8/1972 | Shepherd | 239/400 |
| 5,199,866 A | | 4/1993 | Joshi et al. | |
| 5,743,723 A | * | 4/1998 | Iatrides et al. | 431/8 |
| 5,785,721 A | | 7/1998 | Brooker | |
| 6,113,389 A | | 9/2000 | Joshi et al. | |

FOREIGN PATENT DOCUMENTS

GB  1151453  5/1969

OTHER PUBLICATIONS

International Search Report and Written Opinion for PCT/US2010/024013; mailing date Jun. 23, 2010.

* cited by examiner

*Primary Examiner* — Christopher Kim
(74) *Attorney, Agent, or Firm* — Cantor Colburn LLP (57) ABSTRACT

A fuel injector for injecting fuel into a gasifier includes a mating end including a nozzle portion and a first flange fixedly coupled to the mating end and having a first receiving hole there through and including a first diaphragm disposed therein. The injector also includes a fuel transmission nozzle displaced at least partially within the mating end and passing through the first receiving hole arranged and configured such that a secondary oxygen channel exists between the fuel transmission nozzle and the mating end, the fuel transmission nozzle being fixedly coupled to the first diaphragm and further including a fuel inlet for receiving fuel for introduction into the gasifier.

15 Claims, 6 Drawing Sheets

FUEL INJECTOR GASSIFER NOZZLE HAVING ADJUSTABLE ANNULUS

BACKGROUND OF THE INVENTION

The subject matter disclosed herein relates to gassifiers and, in particular, to adjusting the annulus of an input nozzle to a gassifier.

Gasification is a partial oxidation process that converts carbonaceous materials, such as coal, petroleum, or biomass, into carbon monoxide and hydrogen by reacting the raw material at high temperatures with a controlled amount of oxygen and/or steam. The resulting gas mixture is called synthesis gas or "syngas", which itself is a fuel. Gasification is a relatively efficient method for extracting energy from many different types of organic materials, and also has application as a clean waste disposal technique.

An advantage of gasification is that use of the syngas is relatively more efficient than direct combustion of the original fuel. As a result, more of the energy contained in the fuel is extracted. Syngas may be burned directly in internal combustion engines, used to produce methanol and hydrogen, or converted via the Fischer-Tropsch process into synthetic fuel. Gasification can also begin with materials that are not otherwise useful fuels, such as biomass or organic waste. In addition, the high-temperature combustion refines out corrosive ash elements such as chloride and potassium, allowing clean gas production from otherwise problematic fuels.

Gasification of fossil fuels is currently widely used in electricity generation. For example, the syngas can be cleaned and then sent to a gas turbine/steam turbine combined cycle system where it is used to generate electricity. Pollution causing emissions are captured and cost effectively removed from the syngas stream before combustion. Thus, the overall system converts, e.g., coal into a cleaner burning fuel for generation of electricity there from. Such an overall system is oftentimes referred to as an integrated gasification combined cycle (IGCC) system.

Almost any type of organic material can be used as the raw material for gasification, such as wood, biomass, or even plastic waste. Thus, gasification may be an important technology for renewable energy. In particular biomass gasification can be carbon neutral.

Gasification of fossil fuels typically takes place in a chamber or refractory vessel called a gasifier vessel, which commonly is an internally coated metal structure. Gasifier vessel floors typically include an inverted frusto-conical throat to allow synthesis gas to flow out of the gasifier vessel. A metal gasifier floor supports refractory material, such as a ceramic brick, that covers the metal floor and also supports the refractory material that covers the inner surface of the gasifier vessel.

The rate at which the fossil fuel is introduced into the gasifier may control the amount of synthesis gas produced. In some cases, it may be desirable to vary this rate depending on the operating conditions of the power plant.

BRIEF DESCRIPTION OF THE INVENTION

According to one aspect of the invention, a fuel injector for injecting fuel into a gasifier is provided. The injector includes a mating end including a nozzle portion, the nozzle portion tapering from an outer diameter to a nozzle diameter smaller than the outer diameter, the mating end including an oxygen inlet for receiving oxygen for introduction into the gasifier. The injector also includes a first flange fixedly coupled to the mating end and having a first receiving hole there through and including a first diaphragm disposed therein. The injector also includes a fuel transmission nozzle displaced at least partially within the mating end and passing through the first receiving hole, the fuel transmission nozzle being arranged and configured such that a secondary oxygen channel exists between the fuel transmission nozzle and the mating end. The fuel transmission nozzle is fixedly coupled to the first diaphragm and includes a fuel inlet for receiving fuel for introduction into the gasifier.

According to yet another aspect of the invention, an assembly for delivering a mixture of fuel and air to a gasifier is provided. The assembly includes a fuel injector including a mating end including a nozzle portion. The nozzle portion tapers from an outer diameter to a nozzle diameter smaller than the outer diameter, the mating end including an oxygen inlet for receiving oxygen for introduction into the gasifier. The assembly also includes a first flange fixedly coupled to the mating end and has a first receiving hole there through and includes a first diaphragm disposed therein. The assembly also includes a fuel transmission nozzle displaced at least partially within the mating end and passing through the first receiving hole. The fuel transmission nozzle is arranged and configured such that a secondary oxygen channel exists between the fuel transmission nozzle and the mating end and is fixedly coupled to the first diaphragm and also includes a fuel inlet for receiving fuel for introduction into the gasifier. The assembly further includes a second flange fixedly coupled to the fuel transmission nozzle and having a second receiving hole there through and including a second diaphragm disposed therein. The assembly also includes a primary oxygen transmission nozzle displaced at least partially within the fuel transmission nozzle and passing through the second receiving hole, the primary oxygen transmission nozzle being arranged and configured such that a fuel transmission channel exists between the fuel transmission nozzle and the primary oxygen nozzle, the primary oxygen nozzle being fixedly coupled to the second diaphragm and further including a primary oxygen inlet for receiving fuel for introduction into the gasifier. The assembly also includes a first driver coupled to the first diaphragm that causes the diaphragm to be deflected in either the upstream or the downstream direction.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
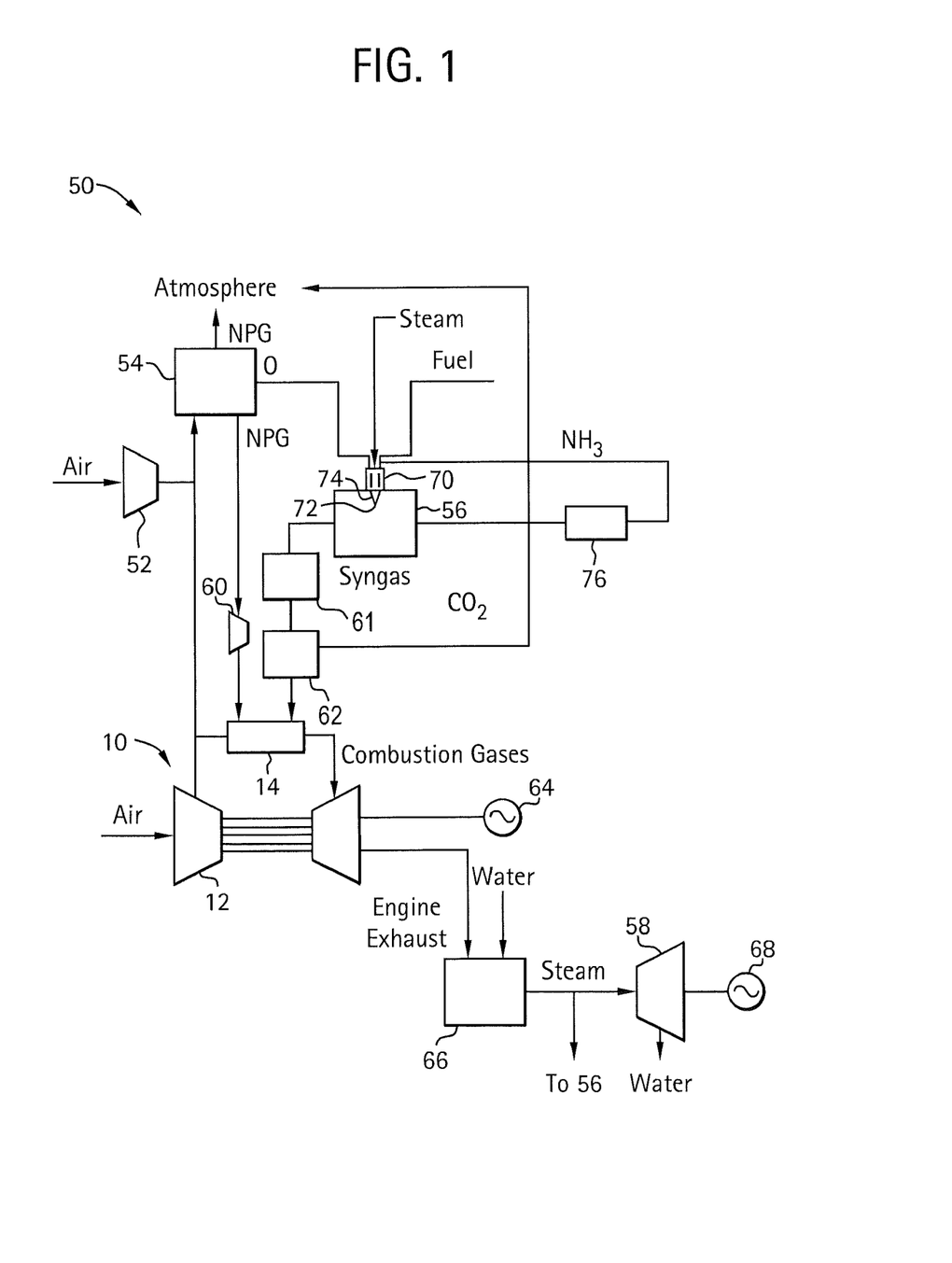
FIG. 1 is a block diagram of an exemplary embodiment of an integrated gasification combined cycle (IGCC) power generation system.

Referring to FIG. 1, an embodiment of an integrated gasification combined cycle (IGCC) power generation system 50 generally includes a main air compressor 52, an air separation unit 54 coupled in flow communication with compressor 52, a gasifier 56 coupled in flow communication with air separation unit 54, a gas turbine engine 10 coupled in flow communication with gasifier 56, and a steam turbine 58.

In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas". The process gas generated by air separation unit 54 includes nitrogen and is referred to as "nitrogen process gas". The nitrogen process gas may also include other gases such as, but not limited to, oxygen and/or argon. For example, in some embodiments, the nitrogen process gas includes between approximately 95% and 100% nitrogen. The oxygen flow is channeled to gasifier 56 for use in generating partially combusted gases, referred to as "syngas" for use by gas turbine engine 10 as fuel. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone, into an output of syngas for use by gas turbine engine 10 as fuel. Although gasifier 56 may use any fuel, in some known IGCC systems 50, gasifier uses coal, petroleum coke, residual oil, oil emulsions, tar sands, and/or other similar fuels. In some known IGCC systems 50, the syngas generated by gasifier 56 include carbon dioxide. The syngas generated by gasifier 56 is then passed through heat exchanger 61, which may be of a radiant or convective design and is used to cool the syngas that exits the gasifier 56. The cooled syngas may be cleaned in a cleanup device 62 before being channeled to gas turbine engine combustor 14 for combustion thereof. Carbon dioxide may be separated from the syngas during cleanup and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 56 for generating the syngas.

In an exemplary embodiment of the IGCC system 50, gasifier 56 may include an injection nozzle 70 extending into the gasifier 56. Injection nozzle 70 may include a nozzle tip 72 at a distal end 74 of injection nozzle 70. In an exemplary embodiment, injection nozzle 70 may be configured such that the annulus thereof is variable in size to allow for operational variation of the gasifer 56. In an exemplary embodiment, IGCC system 50 includes a syngas condensate stripper 76 configured to receive condensate from a stream of syngas discharged from gasifier 56.

Figure 2:
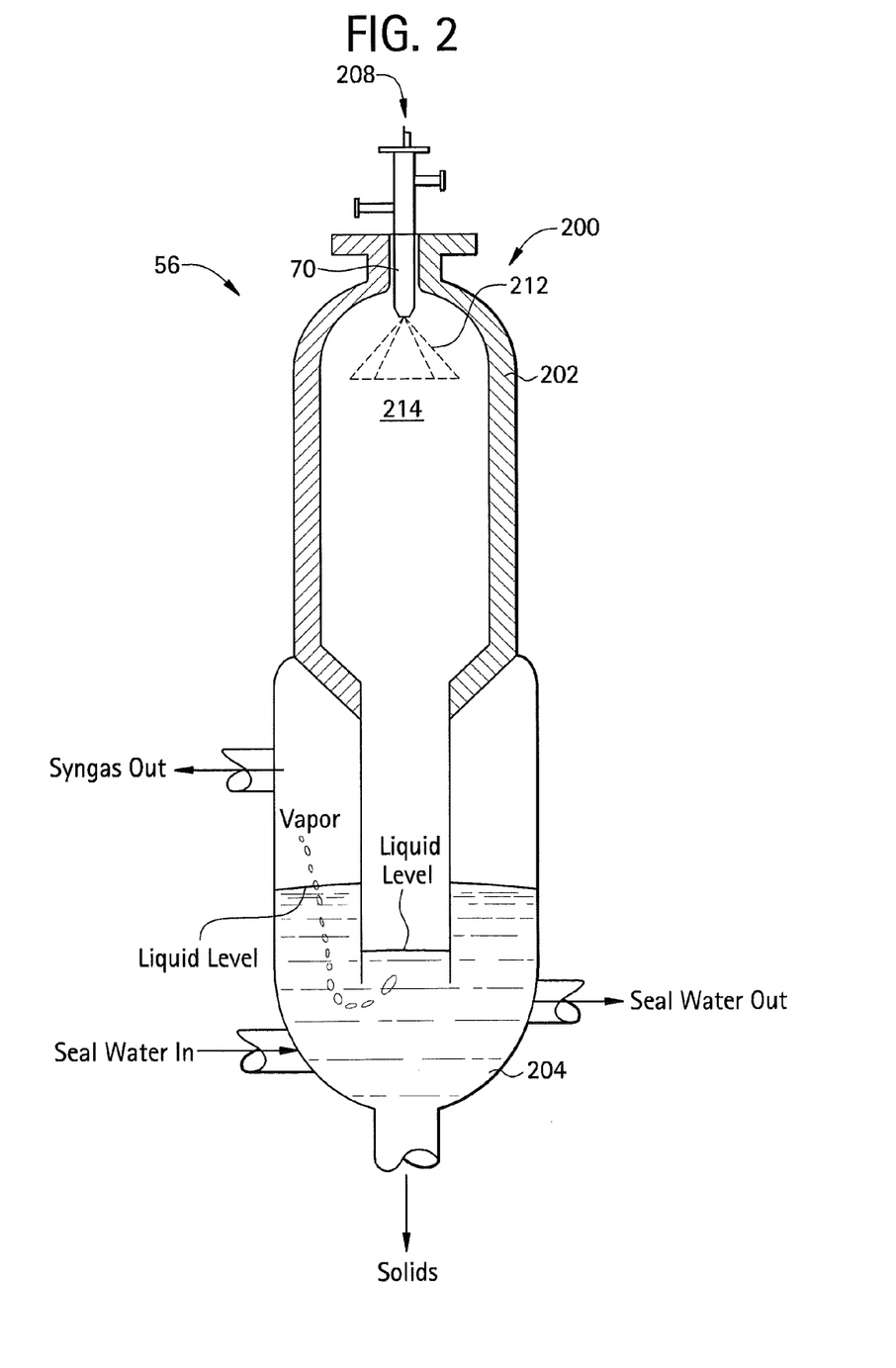
FIG. 2 is a schematic view of an exemplary embodiment of an advanced solids removal gasifier vessel that may be used with the IGCC system of FIG. 1.

Referring to FIG. 2, an exemplary embodiment of a gasifier 56 that may be used with the IGCC system 50 of FIG. 1 includes the gasifier 56 embodied as a vessel 200 having an upper shell 202, a lower shell 204, and a substantially cylindrical vessel body 206 extending therebetween. A fuel injector 208 penetrates upper shell 202 to enable a flow of fuel to be channeled into gasifier 56. Fuel injector 208 includes the fuel injection nozzle 70 that discharges the fuel in a pattern 212 into a combustion zone 214 defined in gasifier 56. According to embodiments of the present invention, the fuel injection nozzle 70 may include a variable annulus such that the pattern 212 may be varied depending on desirable operational characteristics.

Fuel may flow through one or more passages (not shown in FIG. 2) defined in fuel injector 208 and exits fuel injector 208 through nozzle 70. The fuel may be mixed with other substances prior to entering nozzle 70, and/or may be mixed with other substances after being discharged from nozzle 70. For example, the fuel may be mixed with fines recovered from a process of IGCC system 50 prior to entering nozzle 70, and/or the fuel may be mixed with an oxidant, such as air or oxygen, at nozzle 70 or downstream from nozzle 70.

Figure 3:
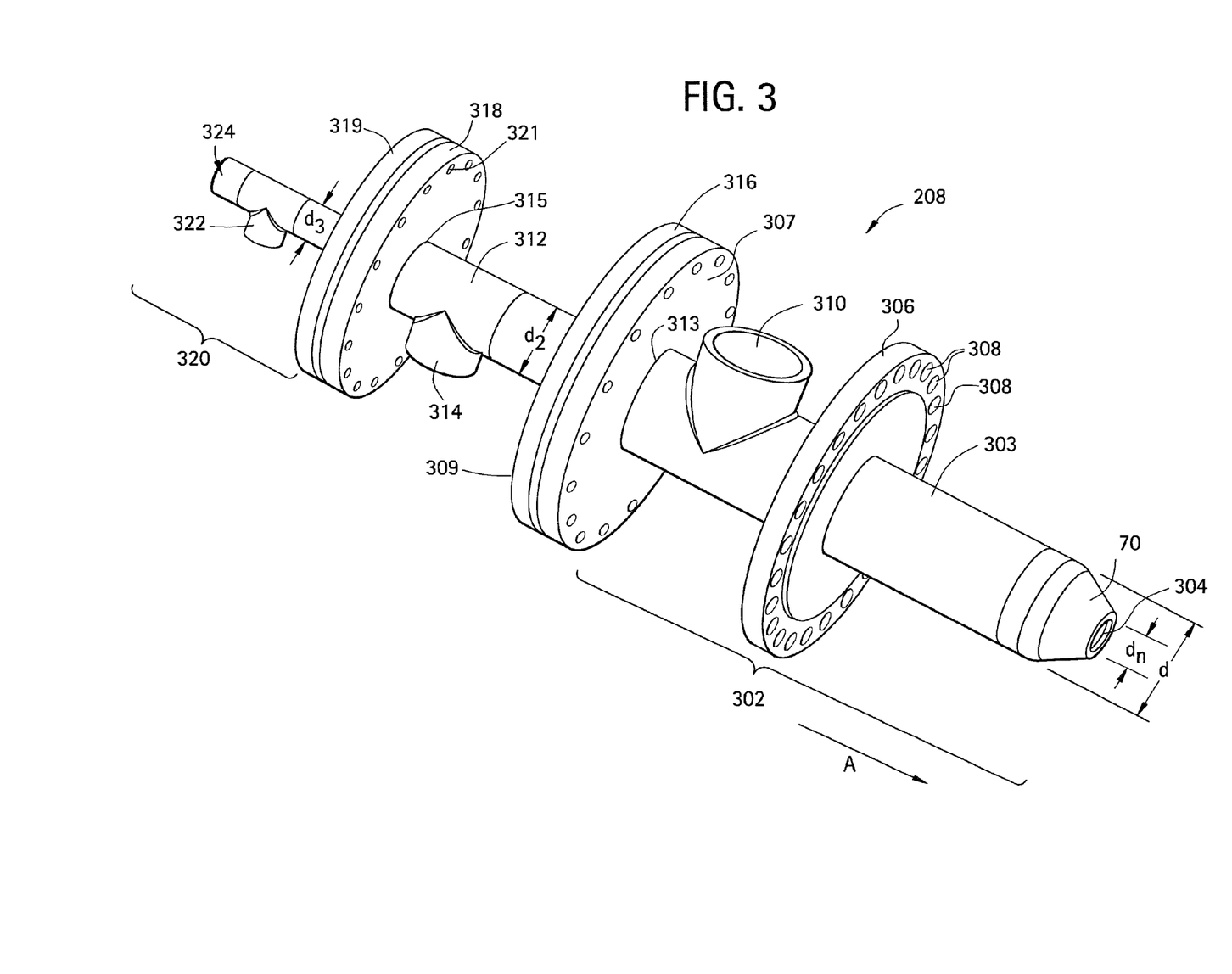
FIG. 3 is a side-view of an injector according to one embodiment.

FIG. 3 shows a more detailed depiction of the fuel injector 208 shown in FIG. 2. Fluid or gasses pass in a direction though the fuel injector 208 as indicated by the arrow A. As described herein, an object or feature is "downstream" from another object if it is located in the direction shown by arrow A from the object. Likewise, an object or feature is "upstream" from another object if it is located in a direction opposite of arrow A.

The injector 208 includes a mating end 302 configured to mate with and be inserted into a gassifier. The mating end 302 serves to direct a mixture of oxygen and fuel into the gassifier. In one embodiment, the mating end 302 may be formed of a cobalt based alloy. Of course, other types metals may be used. For example, the mating end could be nickel. In one embodiment, the mating end may be of the same material as the injector but be coated with a thermal barrier coating.

The mating end 302 has an outer diameter d. The mating end 302 includes, as discussed above, a nozzle 70. The nozzle 70 has outlet hole 304 having a nozzle diameter $d_n$. In one embodiment, the nozzle 70 tapers from the outer diameter d to the nozzle diameter $d_n$.

Coupled to the mating end 302 is an attachment plate 306. The attachment plate 306 may be welded or otherwise fixedly attached to the mating end 302. In one embodiment, the attachment place 306 is welded to an outer surface of the mating end 302. In one embodiment, the attachment plate 306 may include holes 308 configured to receive bolts to secure the attachment plate 306 to a gasifier. This may allow for a portion of the mating end 302 to be inserted into and securely held in the gasifer in a removable manner. In one embodiment, the portion 303 of the mating end 302 downstream of the attachment plate 308 is inserted in the gasifier.

At a location upstream of the attachment plate 306, the mating end 302 includes an oxygen inlet 310. The oxygen inlet 310 may be formed as a T cut into the mating end 302.

The oxygen inlet 310 may be attached to an oxygen supply (not shown) to allow for the introduction of oxygen into the fuel injector 208 and, ultimately, into the gasifier.

The injector 208 may also include a first flange 316. The first flange 316 is fixedly attached to the upstream end 313 of the mating end 302. In one embodiment, the first flange 316 serves to seal the mating end 302 such that oxygen or other gasses introduced at the oxygen inlet 310 flow substantially only in the downstream direction. The first flange 316 may include a diaphragm movably encased therein and which is described below. In one embodiment, the diaphragm is fixedly attached to a fuel transmission nozzle 312.

The fuel transmission nozzle 312 may, in one embodiment, be shaped similar to the mating end. That is, the fuel transmission nozzle 312 may include nozzle portion that tapers from the outer diameter $d_2$ of the fuel transmission nozzle to an opening. In one embodiment, the fuel transmission nozzle fits within the mating end 302. Accordingly, in one embodiment, $d_2$ is less than d. In one embodiment, $d_2$ is greater than $d_n$ to ensure that the fuel transmission nozzle 312 may not pass through the opening 308.

In one embodiment, the first flange 316 has a upstream side 309 and a downstream side 307. The downstream side 307 and the upstream side 309 both include a hole there through that is slightly larger than the fuel transmission nozzle 312. As described in greater detail below, this larger hole may allow the fuel transmission nozzle 312 to move relative to the first flange 316. This allows the tip of the fuel transmission nozzle 312 to move relative to the nozzle 70 and, thereby, to adjust the annulus of the fuel injector 208. In one embodiment, such relative movement may effectively allow for variations in the amount of oxygen provided to the gasifier. The relative movement may also allow for variations in the flow pattern of the oxygen and fuel exiting the nozzle 70. Variations of the flow pattern may improve the oxygen-to-carbon ratio in a manner that may allow for tuning of the system depending on the fuel being used.

The fuel transmission nozzle 312 may include a fuel inlet 314. The fuel inlet 314 may receive, for example, a coal slurry or other carbonaceous fuel. The fuel is passed through the fuel transmission nozzle 312 in the direction of arrow A.

The injector 208 may also include a second flange 318. The second flange 318 is fixedly attached to the upstream end 315 of the fuel transmission nozzle 312. In one embodiment, the second flange 318 serves to seal the mating end 315 of the fuel transmission nozzle 312 such that coal slurry or other fuel introduced at the fuel inlet 314 flows substantially only in the downstream direction. The second flange 318 may include a diaphragm movably encased therein and which is described below. In one embodiment, the diaphragm is fixedly attached to a primary oxygen transmission nozzle 320.

The primary oxygen transmission nozzle 320 may, in one embodiment, be shaped similar to the mating end. That is, the primary oxygen transmission nozzle 320 may include nozzle portion that tapers from the outer diameter $d_3$ of the primary oxygen transmission nozzle 320 to an opening. In one embodiment, the primary oxygen transmission nozzle 320 fits within the fuel transmission nozzle 312. Accordingly, in one embodiment, $d_3$ is less than $d_2$. In one embodiment, $d_3$ is greater than both the opening at the downstream end of the fuel transmission nozzle 312 and $d_n$ to ensure that the primary oxygen nozzle 320 may not pass through the opening 308.

In one embodiment, the second flange 318 has a downstream side 321 and an upstream side 319. The upstream side 319 and the downstream side 321 both include a hole there through that is slightly larger than the fuel transmission nozzle 312. As described in greater detail below, this larger hole may allow the fuel transmission nozzle 312 to move relative to the first flange 316. This allows the tip of the fuel transmission nozzle 312 to move relative to the nozzle 70 and, thereby, to adjust the annulus of the fuel injector 208. In one embodiment, such relative movement may effectively allow for variations in the amount of oxygen provided to the gasifier.

The primary oxygen transmission nozzle 320 may include a primary oxygen inlet 322. The primary oxygen inlet 322 may receive, for example, oxygen or other gasses. The oxygen is passed through the primary oxygen transmission nozzle 320 in the direction of arrow A. In one embodiment, the primary oxygen transmission nozzle 320 include a cap 324 to seal the primary oxygen transmission nozzle 320 and to ensure that substantially all of the oxygen introduced into the primary inlet 322 travels in the direction indicated by arrow A.

In one embodiment, the mating end 302, the fuel transmission nozzle 312 and the primary oxygen transmission nozzle 320 may all be of substantially the same shape. As discussed above, the mating end 302 has a diameter d that is greater than the diameter $d_2$ of the fuel transmission nozzle 312 which is, in turn, greater than the diameter $d_3$ of the primary oxygen transmission nozzle 320. Accordingly, in one embodiment, the primary oxygen transmission nozzle 320 may fit inside the fuel transmission nozzle 312. In one embodiment, the primary oxygen transmission nozzle may 320 may be located within and moved relative to both the fuel transmission nozzle 312 and the mating end 302. In the event that the primary oxygen transmission nozzle 320 is moved in the direction of the arrow A, the amount of fuel introduced by the fuel transmission nozzle 312 to the gasifier may be reduced. Likewise, movement of the primary oxygen transmission nozzle 320 in the opposite direction of the arrow A serves to increase the amount of fuel introduced to the gasifier by the fuel transmission nozzle 312.

The primary oxygen transmission nozzle 320 provides and unrestricted flow path for oxygen to the outlet 308. The rate of flow is defined by the flow of oxygen into the primary oxygen inlet 322. That is, the flow of oxygen is varied not by any movement of the nozzles but, rather, is only controlled by the external oxygen supply. This is in contrast to the oxygen that may be received is by the oxygen inlet 310. Movement of the fuel transmission nozzle 312 in the direction indicated by arrow A will reduce the area between the fuel transmission nozzle 312 and the mating end 302 (on the inside) and thereby reduce the amount of oxygen transmitted to the gasifier. Likewise, movement of the fuel transmission nozzle 312 in the opposite direction will increase the oxygen flow. Accordingly, embodiments of the present invention may vary both the fuel and oxygen flow by, respectively, moving the fuel transmission nozzle 312 relative to the mating end 302 and moving the primary oxygen nozzle 320 relative to the fuel transmission nozzle 312. In more detail, and as described in greater detail below, the relative movement serves to adjust the annulus created by the combination of the tips of the primary oxygen transmission nozzle 320 and the fuel transmission nozzle 312 and having an outer diameter defined by the diameter $d_n$ of opening 304.

Figure 4:
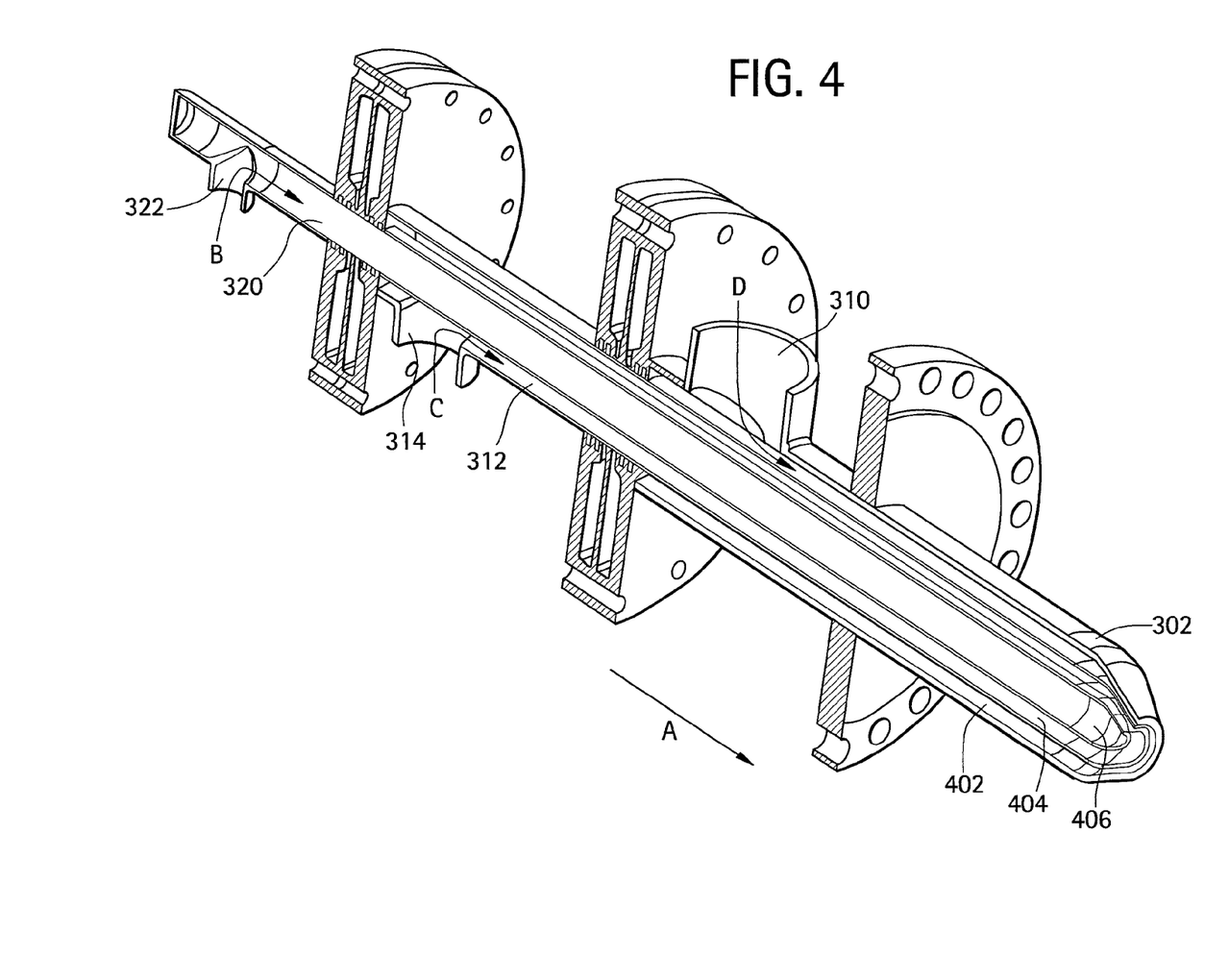
FIG. 4 is a cut-away side-view of the injector shown in FIG. 3.

FIG. 4 shows a cut-away side view of the fuel injector 208. The primary oxygen transmission nozzle 320 is located within the fuel transmission nozzle 322. Oxygen enters the primary oxygen nozzle 320 via the primary oxygen inlet 322 and passes there through in the direction indicated by arrow B. The path of the oxygen though the primary oxygen nozzle 320 has fixed dimensions defined by the shape of the primary oxygen nozzle 320 and shown as primary oxygen path 406.

That is, movement of the primary oxygen nozzle 320 relative to the other portions of the fuel injector 208 does not affect the rate or amount of oxygen passing through the primary oxygen nozzle 320. In one embodiment, the rate, or amount of, oxygen passes through the primary oxygen nozzle 320 may only be controlled by varying the rate or amount of oxygen provided to the primary oxygen inlet 322.

Between the primary oxygen nozzle 320 and the fuel transmission nozzle 313 exists a fuel transmission channel 404. The width of this channel is roughly equal to the difference between the diameter $d_2$ of the fuel transmission nozzle 312 and the diameter $d_3$ of the primary oxygen nozzle 320. Fuel (in the form of a coal slurry or other carbonaceous fuel) is introduced into the fuel transmission channel 404 in the direction indicated by arrow C via the fuel inlet 314. Movement of the primary oxygen nozzle 320 causes (at the tip) the width of the fuel channel 404 to vary. As such, the amount or rate of fuel introduced to the gasifier may be adjusted simply by moving the primary oxygen nozzle 320 relative to the fuel transmission nozzle 312.

Between the fuel transmission nozzle 312 and the mating end 302 exists a secondary oxygen channel 402. The width of this channel is roughly equal to the difference between the inside diameter of the mating end 302 and the diameter $d_2$ of the fuel transmission nozzle 312. Oxygen is introduced into the mating end 302 in the direction indicated by arrow D via the oxygen inlet 310. Movement of the fuel transmission nozzle 312 causes (at the tip) the width of the oxygen channel 402 to vary. As such, the amount or rate of oxygen introduced to the gasifier may be adjusted simply by moving the fuel transmission nozzle 312 relative to the primary oxygen nozzle 320.

As discussed above, variations in the relative positions between the various nozzles may also allow for variations in the flow pattern of the oxygen-fuel mixture as it is introduced into the gasifier. Such flow pattern variations may allow for tuning the operation of the gasifier depending on the fuel being used.

Figure 5:
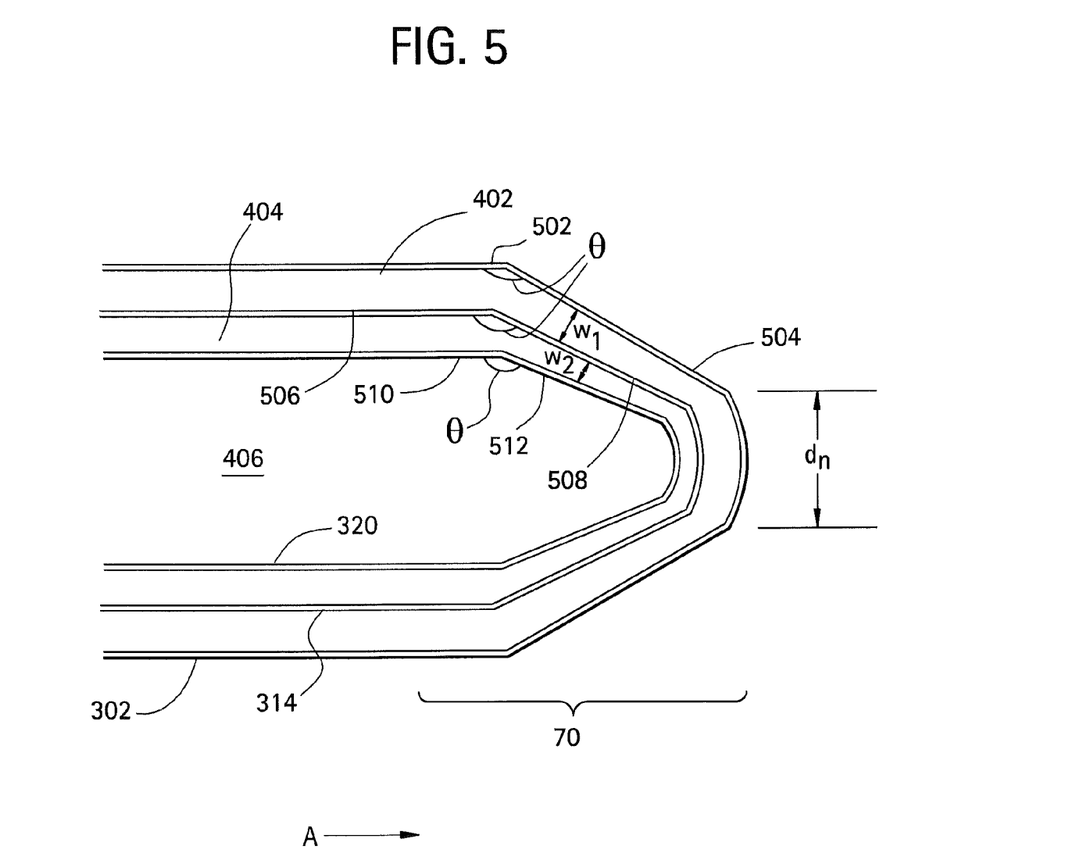
FIG. 5 is a detailed version of the tip of the injector shown in FIG. 4.

FIG. 5 shows a more detailed cut-away side view of the mating end 302 including the nozzle 70. In one embodiment, the nozzle 70 includes angle θ between the flat portion 502 and a sloped portion 504. In one embodiment, the angle θ is approximately 45 degrees. The fuel transmission nozzle 312 also includes the angle θ between the fuel transmission flat portion 506 and the fuel transmission sloped portion 508. In addition, the primary oxygen transmission nozzle 320 includes the angle θ between the oxygen transmission flat portion 510 and the oxygen transmission sloped portion 512.

In one embodiment, as the fuel transmission nozzle 312 is moved in the direction of arrow A, the width $w_1$ between the mating end 302 and the fuel transmission nozzle 312 decreases. Assuming that the mating end 302 and the fuel transmission nozzle 312 are both cylindrical, the annulus created at their distal ends decreases as $w_1$ decreases. Similarly, as the fuel transmission nozzle 312 is moved in the direction opposite of arrow A, the width $w_1$ increases. As the annulus decreases, flow is restricted. Flow is increased as the annulus is increased. In this manner, movement of the fuel transmission nozzle 312 relative to the mating end 302 may vary the rate or amount (or even flow pattern) of oxygen provided to the gasifier.

In one embodiment, as the primary oxygen nozzle 320 is moved in the direction of arrow A, the width $w_2$ between the fuel transmission nozzle 312 and the primary oxygen transmission nozzle 320 decreases. Assuming that the fuel transmission nozzle 312 and the primary oxygen transmission nozzle are both cylindrical, the annulus created at their distal ends decreases as $w_2$ decreases. Similarly, as the primary oxygen transmission nozzle 320 is moved in the direction opposite of arrow A, the width $w_2$ increases. As the annulus decreases, flow is restricted and flow is increased as the annulus is increased. In this manner, movement of the primary oxygen transmission nozzle 320 relative to the fuel transmission nozzle 312 may vary the rate or amount (or even flow pattern) of oxygen provided to the gasifier.

Variation of the annulus may provide, in some instances, an effective way to affect the operation of the gasifer during different operation conditions. If more or less fuel is needed, the primary oxygen transmission nozzle 320 may be moved. If the mixture needs to be varied (leaner or richer), the fuel transmission nozzle 312 may be moved. Of course, to create the desired operation condition, both nozzles 312 and 320 could be simultaneously moved.

As discussed above, the amount of fuel and the mixture thereof may be varied by altering the position (and ultimately the annuluses created) between the various portions of the fuel input 208 (FIG. 3). To this end, diaphragms in the form of deflectable disks may be secured to outer portions of the nozzle to be moved. In one embodiment, these diaphragms may be encased in flanges 316 and 318 (FIG. 3).

Figure 6:
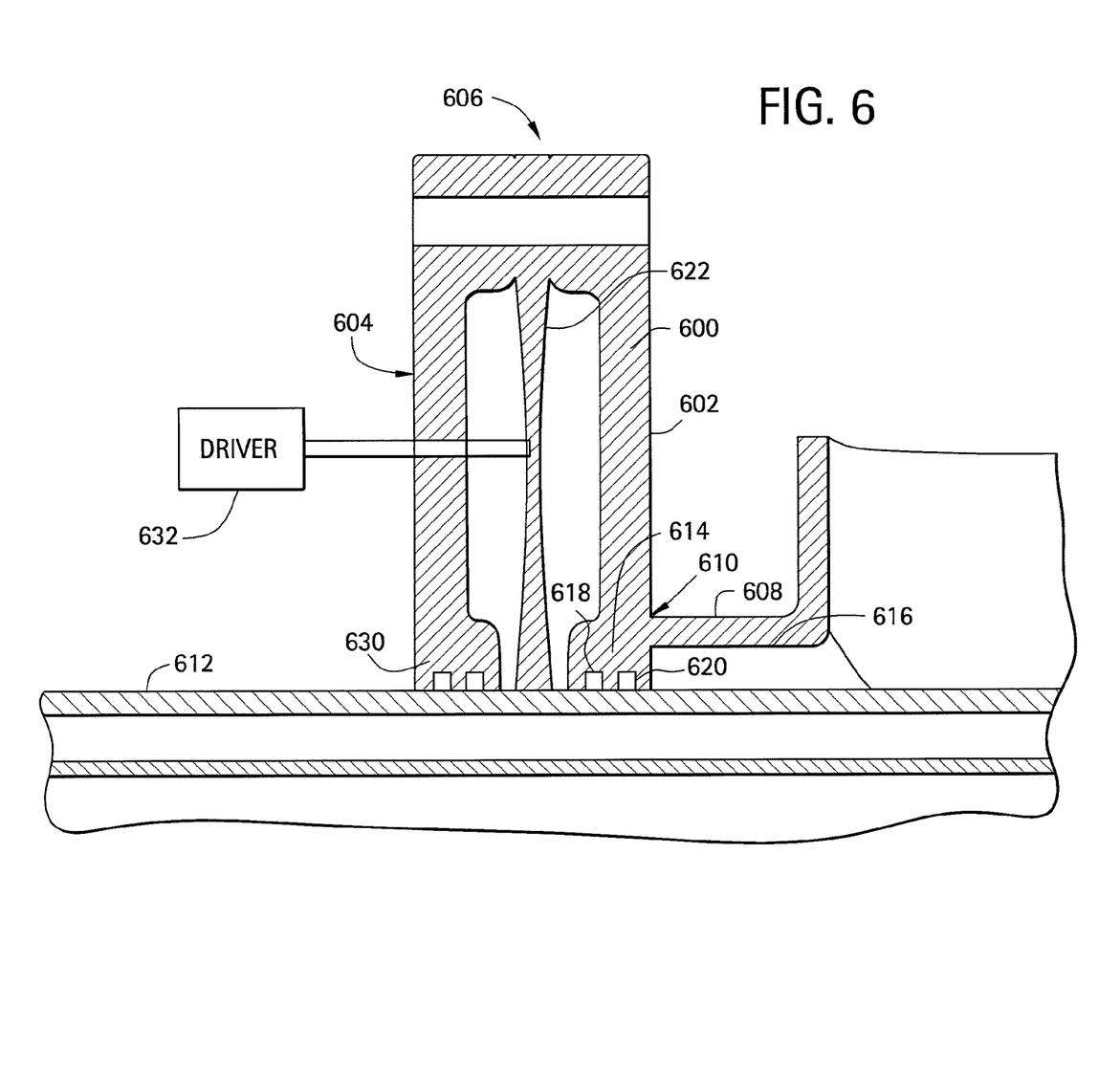
FIG. 6 is a cut-away side view of a diaphragm coupled to a nozzle and surrounded by a flange.

FIG. 6 shows a flange 600 according to one embodiment of the present invention. The flange includes a front side 602 and a backside 604 that may be coupled together at a top end 606. In one embodiment, the front side 602 is welded or otherwise fixedly attached to an outer nozzle 608 at a connection point 610. The nozzle could be either mating end 302 or the fuel transmission nozzle 312 (both shown in FIG. 3). The front side 602 rests on top of an inner nozzle 612. The inner nozzle 612 could be, for example, the fuel transmission nozzle 312 or the primary oxygen transmission nozzle 320 (both shown in FIG. 3). The front side 602 includes a front foot 614 that rests on the outer surface of the inner nozzle 612. The front foot 614 is configured to create a slide-able air-tight seal such that a gas or fluid introduced into the channel 616 between the inner nozzle 616 and the outer nozzle 608 does not travel beyond the front foot. In one embodiment, this may be achieved by including recesses 618 in the front foot. The recesses receive o-rings 620 that surround the inner nozzle 612. In this embodiment, the o-rings 620 maintain the seal while allowing for the inner nozzle 612 to be moved relative to the outer nozzle 608.

In this embodiment, inner nozzle 612 includes a diaphragm 622 fixedly attached thereto. The diaphragm 622 may be made or metal or other repeatedly deformable material. The diaphragm 622 is fixedly attached to the top portion 606 of the flange 600. The diaphragm 622 is movable between the front foot 614 and a back foot 630. The back foot 630 may also have recesses for receiving o-rings as described above to allow the inner nozzle 612 to move relative to it.

Movement of the diaphragm 622 causes the inner nozzle 612 to move in the direction the diaphragm is moved. As described above, such movement may allow for annulus variations. Accordingly, the diaphragm 622 may be coupled to a driver 632. The driver 632 may be any type of driver that causes the diaphragm 622 to move in one direction or the other. For example, the driver 632 may be screw drive or other type of mechanical device. The driver 632 could also be created as a pneumatic device that varies the pressure on either side of the diaphragm 622 to cause the diaphragm to deflect.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fuel injector for injecting fuel into a gasifier, the injector including:
  a mating end including a nozzle portion, the nozzle portion tapering from an outer diameter to a nozzle diameter smaller than the outer diameter, the mating end including an oxygen inlet for receiving oxygen for introduction into the gasifier;
  a first flange fixedly coupled to the mating end and having a first receiving hole there through and including a first diaphragm disposed therein;
  a fuel transmission nozzle displaced at least partially within the mating end and passing through the first receiving hole, the fuel transmission nozzle being arranged and configured such that a secondary oxygen channel exists between the fuel transmission nozzle and the mating end, the fuel transmission nozzle being fixedly coupled to the first diaphragm and further including a fuel inlet for receiving fuel for introduction into the gasifier; and
  a primary oxygen transmission nozzle displaced at least partially within the fuel transmission nozzle.

2. The fuel injector of claim 1, further including a second flange fixedly coupled to the fuel transmission nozzle and having a second receiving hole there through and including a second diaphragm disposed therein.

3. The fuel injector of claim 2, wherein the primary oxygen transmission nozzle is passing through the second receiving hole, the primary oxygen transmission nozzle being arranged and configured such that a fuel transmission channel exists between the fuel transmission nozzle and the primary oxygen nozzle, the primary oxygen nozzle being fixedly coupled to the second diaphragm and further including a primary oxygen inlet for receiving fuel for introduction into the gasifier.

4. The fuel injector of claim 3, wherein the second diaphragm is coupled to an external driver that causes the diaphragm to be deflected in either the upstream or downstream direction.

5. The fuel injector of claim 4, wherein movement of second diaphragm in the downstream direction reduces the amount of fuel introduced into the gasifier and movement in the downstream direction increases the amount of fuel introduced into the gasifier.

6. The fuel injector of claim 4, wherein movement of the first diaphragm in the downstream direction reduces the amount of oxygen introduced into the gasifer and movement in the upstream directed increases the amount of oxygen introduced into the gasifier.

7. The fuel injector of claim 1, further comprising:
  a connection plate fixedly attached to the mating end for coupling the fuel injector to the gasifier.

8. The fuel injector of claim 1, wherein the first diaphragm is formed of a deflectable metal.

9. The fuel injector of claim 1, wherein the oxygen inlet is formed as a T cut into the mating end.

10. The fuel injector of claim 1, wherein the fuel inlet is formed as a T cut into the fuel transmission nozzle.

11. The fuel injector of claim 1, wherein the mating end is formed of a cobalt based alloy or treated with a thermal barrier coating.

12. The fuel injector of claim 1, wherein the first diaphragm is coupled to an external driver that causes the first diaphragm to be deflected in either the upstream or downstream direction.

13. An assembly for delivering a mixture of fuel and air to a gasifier, the assembly including:
  a fuel injector comprising:
    a mating end including a nozzle portion, the nozzle portion tapering from an outer diameter to a nozzle diameter smaller than the outer diameter, the mating end including an oxygen inlet for receiving oxygen for introduction into the gasifier;
    a first flange fixedly coupled to the mating end and having a first receiving hole there through and including a first diaphragm disposed therein; and
    a fuel transmission nozzle displaced at least partially within the mating end and passing through the first receiving hole, the fuel transmission nozzle being arranged and configured such that a secondary oxygen channel exists between the fuel transmission nozzle and the mating end, the fuel transmission nozzle being fixedly coupled to the first diaphragm and further including a fuel inlet for receiving fuel for introduction into the gasifier;
    a second flange fixedly coupled to the fuel transmission nozzle and having a second receiving hole there through and including a second diaphragm disposed therein; and
    primary oxygen transmission nozzle displaced at least partially within the fuel transmission nozzle and passing through the second receiving hole, the primary oxygen transmission nozzle being arranged and configured such that a fuel transmission channel exists between the fuel transmission nozzle and the primary oxygen nozzle, the primary oxygen nozzle being fixedly coupled to the second diaphragm and further including a primary oxygen inlet for receiving fuel for introduction into the gasifier;
  a first driver coupled to the first diaphragm that causes the diaphragm to be deflected in either the upstream or the downstream direction.

14. The assembly of claim 13, wherein the second diaphragm is coupled to an second driver that causes the diaphragm to be deflected in either the upstream or downstream direction.

15. The fuel injector of claim 13, wherein movement of the first diaphragm in the downstream direction reduces the amount of oxygen introduced into the gasifer and movement in the upstream directed increases the amount of oxygen introduced into the gasifier.

* * * * *